Dec. 8, 1959        W. H. LEE        2,916,113

SECURING OF INSERT ELEMENTS IN GRILLES AND THE LIKE

Filed Dec. 2, 1955

INVENTOR.
WILLIAM H. LEE
BY
Irving Seidman
ATTORNEY

United States Patent Office 2,916,113
Patented Dec. 8, 1959

2,916,113

SECURING OF INSERT ELEMENTS IN GRILLES AND THE LIKE

William H. Lee, Mount Vernon, N.Y.

Application December 2, 1955, Serial No. 550,639

3 Claims. (Cl. 189—84)

The present invention relates to arrangements for securing insert elements, for example, monograms, ornamental figures or numerals, in grilles of the kind employed on metal storm or screen doors, as balcony railings and as room dividers.

It is usual in the metal grille producing industry to provide various standardized designs, and to make provision in such designs for the insertion of a wide variety of elements lending individuality to the complete grille. Usually, the space left in the grille design for the insert element is intended to accommodate an element having a circular rim as a part thereof, and the grille design includes portions that contact at least several locations on the periphery of the circular rim where rivets or nuts and bolts are employed to secure the insert element to the grilles. However, the upsetting of such rivets is time consuming and requires some degree of skill so that the use of rivets to secure the insert elements in the grille undesirably increases the installation costs, while the relatively bulky nuts and bolts, when substituted for the rivets, detract from the appearance of the installation. Further, the holes in the circular rim of the insert element to accommodate the rivets or bolts cannot be pre-drilled, as the locations where the rim is contacted by portions of the grille will vary from one grille design to another grille design, so that holes must be drilled in the rim of the insert element at the time of installation to thereby further complicate the installation procedure.

Accordingly, it is an object of this invention to provide a simple arrangement for securing insert elements in grilles of the described character, and particularly to permit the installation of the insert elements without resorting to the use of any tools, such as, drills, rivet upsetting devices and the like, so that the insert elements can be installed by relatively unskilled personnel in a short time.

Another object is to secure the insert elements in grilles of the described character in a manner to prevent the removal of the elements by vandals or pranksters, particularly when the grilles are situated at the exterior of a building structure, for example, as is the case with grilles on storm or screen doors, or on gates, fences or balconies.

A further object is to provide inconspicuous means for securing the insert elements in grilles of the described character, so that the securing means do not mar the attractiveness of the grille design.

In accordance with the present invention, the above, and other objects, features and advantages, are achieved by providing at least the portions of the grille design that define the space to receive an insert element with one or more longitudinal grooves facing away from said space, while the standardized rim of the insert element has a forwardly opening, annular groove in its front edge face and is adapted to fit into said space defined by the portions of the grille design and to be peripherally contacted by the latter, and resilient metal clips securing the insert element rim to the portions of the grille design at the points of contact with the latter, each of the clips including a normally bowed body portion, hooked extensions at the opposite ends of the body portion respectively adapted to engage in the annular groove of the element rim and to embrace the back edges of the rim and the grille portion contacted by the latter while the bowed body portion is flattened against the outer surface of the grille portion and prongs extending from the body portion and engaging in at least one groove of the contacted grille portion whereby the resilient metal clips prevent removal of the rim of the insert element from the contacted portions of the grille design.

In order that the invention may be fully understood, illustrative embodiments thereof are hereinafter described in detail with reference to the accompanying drawing, which forms a part hereof, and wherein.

Figure 1:
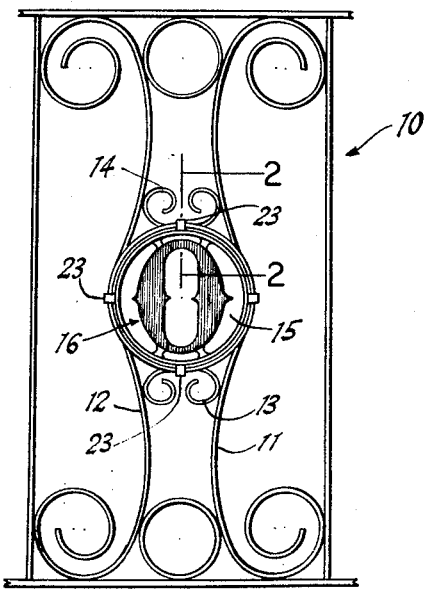
Fig. 1 is an elevational view of a portion of a grille having an insert element secured therein in accordance with an embodiment of the present invention.

Referring to the drawing in detail, and initially to Fig. 1 thereof, a portion of an ornamental grille is there shown and generally identified by the reference numeral 10. The grille 10 may be employed on a storm or screen door, as a balcony railing, as a room divider or for any of the many other normal uses thereof, and may be formed of wrought iron, aluminum or any other suitable metal. As is the usual practice, the design of the grille 10 includes curved bars 11, 12, 13 and 14 that define a space 15 intended to accommodate a selected one of a large number of insert elements which may be formed of cast aluminum or the like and which depict monograms, numerals or ornamental figures or motifs. Thus, the grilles can be furnished in a limited number of standardized designs to which individuality is imparted by the installation of selected different insert elements in the space or spaces provided therefor. For example, the desired indiviluality of the grille design can be achieved by the installation of an insert element 16 bearing the monogram of the owner or occupant of the house, or an insert element bearing the street number of the house may be employed in the case of a grille on a storm or screen door.

Figure 2:
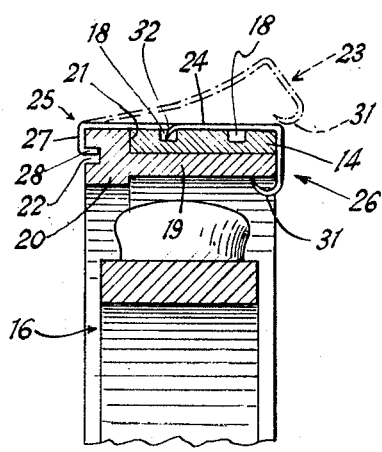
Fig. 2 is an enlarged, fragmentary sectional view taken along the line 2—2 of Fig. 1.

The bars 11, 12, 13 and 14 are preferably extruded with at least one longitudinal groove 18 in the surface thereof facing away from the space 15, two of such grooves, extending parallel to each other, being provided in the grille bar 14 shown in Fig. 2.

Each of the insert elements 16, irrespective of the design or motif thereof, has a circular rim 19 of standardized diameter fitting axially into the space 15 provided therefor from the front of the grille, and the rim 19 has a relatively thick annular portion 20 along its forward edge that defines a radial, external shoulder 21 facing rearwardly to abut against the forward edges of the portions of grille bars 11, 12, 13 and 14 contacting the radially outer surface of rim 19 thereby limiting the rearward axial movement of the insert element 16 relative to the grille 10. The radial depth of the shoulder 21 is equal to the thickness of each of the bars 11, 12, 13 and 14 so that, at the points where the latter contact the rim 19, the outer surfaces of the bars, that is, the surfaces facing away from the rim, are flush with the outer peripheral surface of the thick annular portion 20 of the rim. The thick annular portion 20 of the insert element rim has an annular or circular, forwardly opening groove 22 formed in the front edge face thereof (Fig. 2).

In accordance with the present invention, the selected insert element 16 is secured within the space 15 of the grille 10 by a plurality of resilient metal clips which are generally identified by the reference numerals 23. Each clip 23 includes an elongated, normally bowed body portion 24 having hook-shaped extensions 25 and 26 at the opposite ends thereof. The hook-shaped extension 25 at one end of body portion 24 includes a part 27 bent at right angles to the body portion and extending from the latter in the direction in which the convex surface of body portion 24 faces, and a flange 28 along the edge of part 27 directed toward the hook-shaped extension 26 at the opposite end of the body portion. The part 27 has a width approximately equal to the radial distance from the groove 22 to the outer peripheral edge of the annular portion 20 on rim 19 so that the flange 28 can engage in the groove 22 while the body portion 24 extends across the flush outer surfaces of the thick annular portion 20 and the grille bar 11, 12, 13 or 14 to which the related clip is to secure the insert element rim.

The hook-shaped extension 26 also includes a part 29 extending at right angles to the adjacent end of body portion 24 at the side of the latter that is convex, and a projection 30 extends from the edge of part 29 towards the hook shape extension 25. The free end 31 has a sharp edge and is curved around until it is at 90° with the body section of the body portion 24, for the purpose hereinafter described in detail. The width of the part 29 is substantially equal to the combined thicknesses of the rim 19 and of the grille bar to which the rim is to be secured so that, as shown in Fig. 2, the hook-shaped extension 26 embraces the back edges of the grille bar and the insert element rim.

In using the above described resilient metal clip 23 to secure the insert element rim 19 to a grille bar in contact with the latter, for example, to the grille bar 14, the flange 28 of the extension 25 is initially engaged in the groove 22 with the bowed body portion 24 and hook-shaped extension 26 occupying the positions shown in broken lines of Fig. 2, where the curved free end 31 of the projection 30 is seen to ride upon the back edge of the bar 14. When the body portion 24 is pressed inward, that is, toward the outer surface of bar 14, the curved end 31 of the projection 30 cam over the back edge of bar 14 and, as the body portion 24 is flattened against the flush outer surfaces of bar 14 and annular portion 20, the projection 30 engages under the radially inner surface of the rim 19. The flattening of the normally bowed body portion 24 tends to move the projection 30 axially in the direction toward the hook-shaped extension 25 at the front end of the clip to ensure the engagement of the projection 30 under the back portion of the rim 19 and the digging into the metal of said rim by the free end 31. Such engagement prevents the resilient return of the body portion 24 to its bowed condition. Thus, the projection 30 is always urged radially outward against the inner surface of rim 19 by the tension in the flattened body portion 24 and removal of the clip 23 from its operative position (shown in full lines on Fig. 2) is avoided. It will be noticed that as the spring metal clip is forced into position straightening the back of clip 24, the projecting hook 30 and free end 31 is displaced backwards against spring pressure and as the clip reaches the point where the sharp edge clears the back edge of rim 19 the prongs 32 or 32a, 33a snap into locking position.

Figure 3:
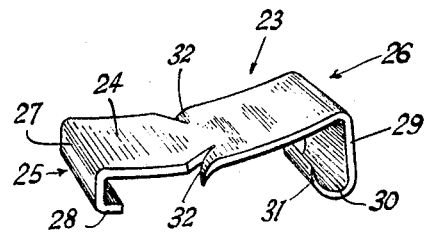
Fig. 3 is a perspective view of a securing clip included in the assembly of Figs. 1 and 2.
Figure 4:
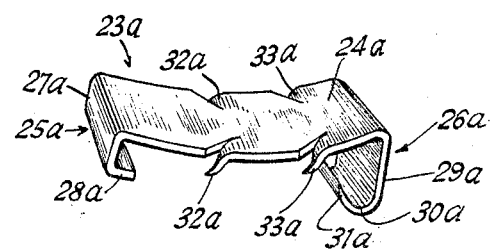
Fig. 4 is a view similar to Fig. 3, but showing a modified securing clip.

In order to prevent forward movement of the clip 23 relative to the rim 19 and bar 14 during the above described flattening of the body portion 24, which forward movement would withdraw the flange 28 from groove 22 and also displace the curved free end 31 of the projection 30 from the position where the latter can cam over the back edge of the bar 14, the body portion 24 of the clip preferably has at least one pair of prongs 32 struck from the opposite longitudinal edges thereof and inclined toward the extension 25. The prongs 32 are located, as shown in Fig. 2, so that, as flattening of the body portion 24 commences, the prongs reach into a related one of the grooves 18 of the grille bar 14, whereby the relative axial positions of the rim 19 and bar 14 are fixed between the hook-shaped extension 25 and the prongs 32. Since the prongs 32 cooperate with the hook-shaped extension 25 to axially position the rim 19 relative to the bar 14, it is apparent that the body portion 24 of the clip 23 can have a length slightly greater than the axial length of the rim 19 with the portion 20 on the front edge thereof so that some clearance (not shown) may exist between the back edges of bar 14 and rim 19 and the part 29 of extension 26, such clearance facilitating the movement of the latter to its operative position.

Where the bars of the grille design have two grooves 18 extending longitudinally therealong, for example, as does the bar 14 of Fig. 2, a modified resilient metal clip may be employed, as illustrated in Fig. 4 and there generally identified by the reference numeral 23a. The clip 23a is substantially similar to the clip 23 described above in connection with Figs. 2 and 3, and the parts of clip 23a are identified by the same reference numerals as those employed on the corresponding parts of the clip 23, but with the letter "a" annexed thereto.

The body 24a of the modified clip 23a has two pairs of prongs 32a and 33a struck therefrom at spaced apart locations along its opposite longitudinal edges and adapted to engage in the two grooves 18 of the bar 14 when the clip 23a is operatively positioned for securing the rim 19 of the insert element to the bar of the grille.

The prongs 32 or 32a and 33a of the resilient metal clip further serve to lock the clip in its operative position for preventing removal of the secured insert element by vandals or pranksters. In the absence of such prongs, a pull exerted on the insert element 16 in the forward direction would tend to bend the part 29 or 29a of the clip from its position at right angles to the body portion 24 or 24a, respectively, and might eventually free the projection 30 or 30a from under the back edge of the rim 19. However, the prongs 32 or 32a and 33a, which incline forwardly into the related grooves 18 of the grille bar, are relatively short and, therefore, capable of resisting a strong forward pull without being distorted or mutilated to the extent necessary for their removal from the grooves 18.

It is apparent from Fig. 1 that the clips 23 or 23a, when operative to secure the insert element 16 within the space 15 provided therefor in the grille design 10, are unobtrusive and do not detract from the appearance of the design. Further, it will be seen that the use of the clips for securing the insert element within the grille design does not require the drilling of holes in either the rim 19 of the insert element or the bars 11, 12, 13 and 14 of the grille design, as is the case when employing rivets or nuts and bolts for the same purpose, and that clips 23 or 23a can be engaged with the rim of the insert element and the related bars of the grille design without the use of special tools for that purpose.

Figure 5:
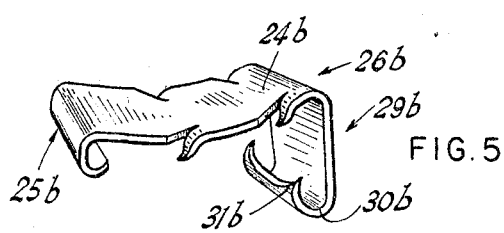
Fig. 5 is a perspective view of still another modified securing clip.

The metal clip shown in Fig. 5 is in all respects similar to that shown in Fig. 4 except that the hook-shaped extension 26b has a forked projection 30b which extends from the edge of part 29b toward the hook-shaped extension 25b. The free ends of the forked projection 30b are curved in the direction towards the body portion 24b as at 31b, for the same purpose hereinbefore described in detail.

Although illustrative embodiments of the invention have been described in detail herein with reference to the accompanying drawing, it is to be understood that the invention is not limited to those precise embodiments, and that various changes and modifications may be effected in the latter without departing from the scope or spirit of the invention as defined in the appended claims.

What is claimed is:

1. A resilient metal clip for securing an insert element having a rim with a groove in its front edge surface within a space defined in a grille by bars contacting the rim and having longitudinal grooves in their outer surfaces; said clip comprising a longitudinally bowed body portion adapted to extend across the outer surface of a related grille bar at the location of contact of the latter with the rim, an inwardly directed hook-shaped extension at the front end of said body portion for engagement in the groove of the insert element rim, an inwardly directed hook-shaped extension at the back end of said body portion for embracing the back edge portions of the related bar and rim when said body portion is flattened against the outer surface of the related grille bar, and prongs struck from said body portion for engagement in at least one of the longitudinal grooves of the related grille bar.

2. A resilient metal clip according to claim 1; wherein said back end extension terminates in a projection curved toward said body portion for camming over the back edges of the related grille bar and rim during flattening of said body portion and for gripping the inner surface of the related grille bar when urged against that inner surface by the tension in the flattened body portion.

3. A resilient metal clip according to claim 1; wherein said back end terminates in a forked projection curved toward said body portion for camming over the back edges of the related grille bar and rim during flattening of said body portion and for gripping the inner surface of the related grille bar when urged against the inner surface by the tension in the flattened body portion.

References Cited in the file of this patent

UNITED STATES PATENTS

| | | |
|---|---|---|
| 1,020,916 | Lanier | Mar. 19, 1912 |
| 1,146,251 | Harp | July 13, 1915 |
| 1,517,944 | Bobbitt | Dec. 2, 1924 |
| 1,595,844 | Winter | Aug. 10, 1926 |
| 2,423,955 | Widener | July 15, 1947 |
| 2,656,577 | Carbary | Oct. 27, 1953 |
| 2,689,027 | Flora | Sept. 14, 1954 |
| 2,695,806 | Balint | Nov. 30, 1954 |
| 2,698,470 | Buedingen | Jan. 4, 1955 |
| 2,743,544 | Wilson | May 1, 1956 |